(12) United States Patent
Kurosawa

(10) Patent No.: US 7,681,888 B2
(45) Date of Patent: Mar. 23, 2010

(54) ROBUST SEALING SYSTEM FOR POWER STEERING INPUT SHAFT

(75) Inventor: Tsuyoshi Kurosawa, Plymouth, MI (US)

(73) Assignee: SKF USA Inc., Elgin, IL (US)

( * ) Notice: Subject to any disclaimer, the term of this patent is extended or adjusted under 35 U.S.C. 154(b) by 0 days.

(21) Appl. No.: 11/307,636

(22) Filed: Feb. 15, 2006

(65) Prior Publication Data

US 2007/0187902 A1    Aug. 16, 2007

(51) Int. Cl.
   *F16J 15/32*    (2006.01)
   *F16J 15/34*    (2006.01)
(52) U.S. Cl. .................. 277/353; 277/551; 277/572; 277/577
(58) Field of Classification Search ......... 277/350–351, 277/353, 549, 551, 562, 564, 568, 572, 577
   See application file for complete search history.

(56) References Cited

U.S. PATENT DOCUMENTS

| | | | |
|---|---|---|---|
| 2,966,376 A | 12/1960 | Reynolds | |
| 3,021,161 A * | 2/1962 | Rhoads et al. | 277/568 |
| 3,612,547 A | 12/1971 | Kan | |
| 4,427,206 A * | 1/1984 | Sugiyama | 277/568 |
| 4,531,748 A * | 7/1985 | Jackowski | 277/551 |
| 4,550,920 A | 11/1985 | Matsushima | |
| 4,623,153 A * | 11/1986 | Nagasawa | 277/551 |
| 4,792,243 A * | 12/1988 | Takeuchi et al. | 384/486 |
| 4,981,303 A | 1/1991 | Matsushima et al. | |
| 5,042,822 A | 8/1991 | Dreschmann et al. | |
| 5,083,802 A * | 1/1992 | Shimasaki et al. | 277/560 |
| 5,137,285 A | 8/1992 | Pick | |
| 5,326,112 A * | 7/1994 | Paykin | 277/575 |
| 5,509,666 A | 4/1996 | Abraham et al. | |
| 5,611,548 A * | 3/1997 | Dahlhaus | 277/574 |
| 5,678,828 A * | 10/1997 | Hamaya | 277/346 |
| 5,957,461 A * | 9/1999 | Ulrich | 277/569 |
| 6,042,272 A * | 3/2000 | Nagase | 384/486 |
| 6,050,571 A | 4/2000 | Rieder et al. | |
| 6,170,992 B1 * | 1/2001 | Angelo et al. | 384/477 |
| 6,193,264 B1 * | 2/2001 | Seon | 280/652 |
| 6,257,587 B1 | 7/2001 | Toth et al. | |
| 6,279,914 B1 | 8/2001 | Yamanaka et al. | |
| 6,322,082 B1 | 11/2001 | Paykin | |
| 6,357,754 B1 | 3/2002 | Rieder et al. | |
| 6,367,810 B1 * | 4/2002 | Hatch | 277/551 |
| 6,565,096 B2 | 5/2003 | Ikeda et al. | |
| 6,676,132 B1 | 1/2004 | Takebayashi et al. | |
| 2004/0130101 A1 | 7/2004 | Osako et al. | |
| 2004/0169339 A1 | 9/2004 | Bock et al. | |
| 2004/0239041 A1 | 12/2004 | Morimoto et al. | |

OTHER PUBLICATIONS

U.S. Patent and Trademark Office—PCT, International Search Report and Written Opinion of the International Searching Authority, Jun. 5, 2008, pp. 1-5.

* cited by examiner

*Primary Examiner*—Vishal Patel
(74) *Attorney, Agent, or Firm*—Vedder Price P.C.

(57) ABSTRACT

A sealing system for sealing high liquid pressure and containing a wiper lip in either of two forms. The light pressure seal includes a seal casing, a seal body including a lip seal, a snap ring and a plastic back-up ring, and the wiper lip seals on either a radial or an axial surface. The casing may have radial and axial flanges or a radial flange only. The space between the two seals may be filled with grease.

4 Claims, 3 Drawing Sheets

ROBUST SEALING SYSTEM FOR POWER STEERING INPUT SHAFT

DESCRIPTION

The present invention relates generally to sealing systems for high pressure sealing applications. More particularly, it relates to a composite sealing system comprising a high-pressure seal and a cooperating excluder seal in various forms providing axial and/or radial sealing elements(s). The invention also relates to a hydraulic power steering rotational shaft seals including but not limited to the steering input shaft seal, which features a back up ring, having one or more additional sealing and excluding functions. In particular, it relates to an apparatus and method of sealing which includes one or more axial or radial sealing elements. For example, in one application, the excluder lip rides on a radial surface (i.e. shaft), and in the other case, the dust lip rides on an axial end-face surface (i.e. a housing face).

In this and other applications, the excluder lip is extremely important, especially because of the inaccessibility of the seal for repair or maintenance purposes. One or more axial and/or radial sealing lips can be designed in the system, as well as one or more grease-packed cavities as an additional layer to block contaminant ingress.

Accordingly, it is the object of the present invention to provide a robust sealing system of improved durability and reliability, particularly where conditions of extreme fluid pressure and aggressive external contamination are present. This is very critical in recent competitive markets, where the warranty requirement is becoming more and more demanding, especially for commercial vehicle applications where the long-term reliability has a significant impact on business.

Another object is to provide a high-pressure seal, which is backed up with an excluder seal with the lip in contact with the housing containing highly pressurized fluid.

Another object is to provide a fluid sealing system which includes an excluder lip or the like resting on a housing for holding the high pressure seal.

Another object is to provide a composite seal which includes a plastic back-up ring, which limits the lip wear and provides extended service life under conditions of elevated fluid pressure and presence of abrasive external contaminants, when compared to the design without the back-up ring.

Another object is to provide one or more axial excluding lip(s), which are capable of tolerating greater shaft misalignments and/or deflection, when compared to the radial lip design.

SUMMARY OF THE INVENTION

The invention achieves these and other of its objects including those which are inherent therein, by providing a composite seal arrangement including a high-pressure seal with a back-up ring, and one or more auxiliary excluder lips which bear on either the radial surface of the shaft or the axial face of the secondary seal, or both.

The exact manner in which this invention achieves these and other objects will become more apparent when reference is made to the following description of the preferred embodiments of the invention and shown in the accompanying drawings in which like reference numerals indicate corresponding parts throughout.

BRIEF DESCRIPTION OF THE DRAWINGS

FIG. 2A shows an additional radial lip on the primary seal; and

DESCRIPTION OF THE PREFERRED EMBODIMENTS OF THE INVENTION

While the invention may be practiced in different forms depending on the steering gear configuration, and variations of the described embodiments, will occur to those skilled in the art, some examples of the preferred forms are provided hereafter.

Figure 1:
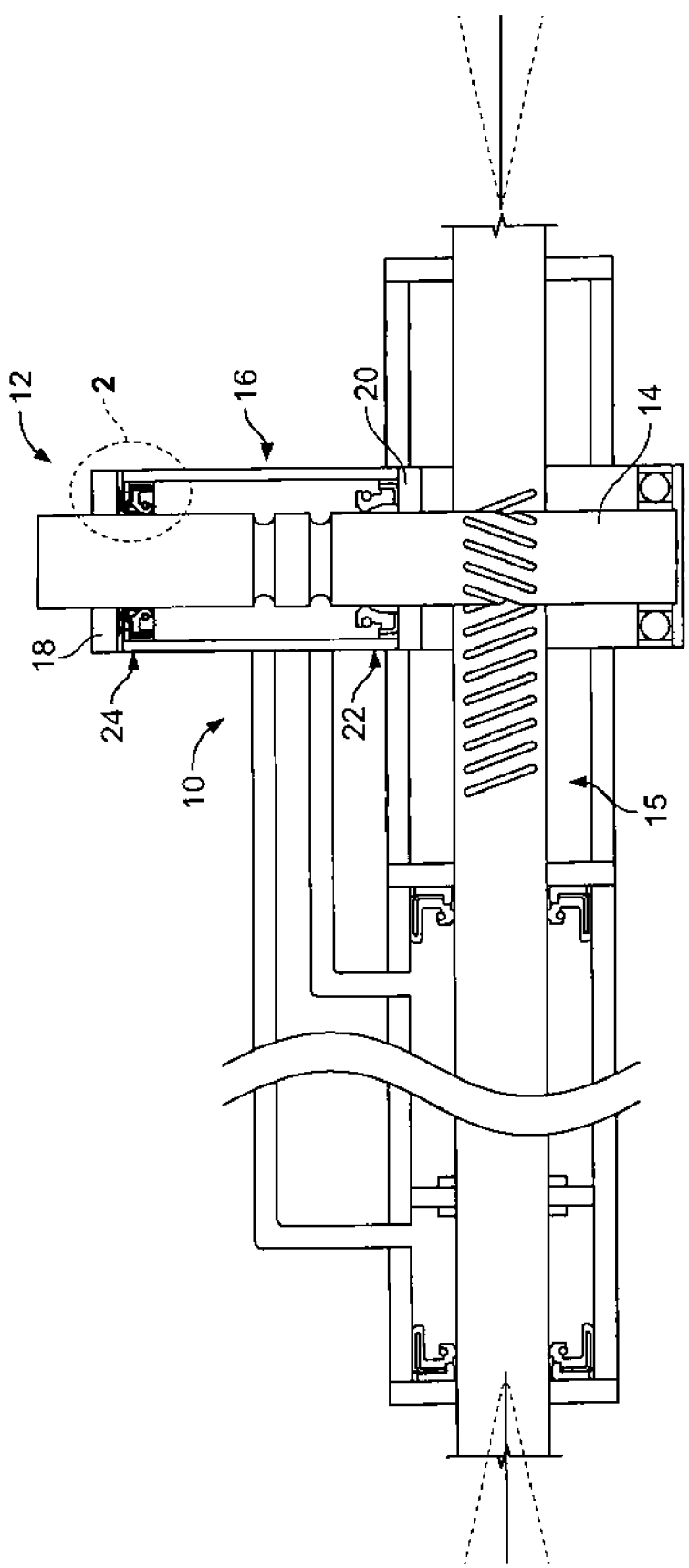
FIG. 1 is an illustrative, somewhat schematic drawing showing the seal in its overall environment of a rack and pinion power steering gear.

Referring now to the drawings in greater detail, FIG. 1 shows a rack and pinion steering arrangement generally designated 10. This arrangement is shown to include an upper steering input portion generally designated 12, a lower pinion gear portion 14 and a rack gear portion 15 engaged with the pinion gear portion 14. The upper portion 12 is held within a fluid-containing valve housing 16 having end portions 18 and 20 which contain lower (i.e. pinion shaft) and upper (i.e. input shaft) assemblies generally designated 22 and 24, respectively.

The seal assembly 24 is an important part of the invention and is adapted to seal fluid under pressure while excluding various types of grit, dust or dirt in dry or liquid form present in the environment. This upper portion is very inaccessible for maintenance or servicing, and yet is subject to contamination, in which the contaminants may accumulate over an extended period of time and adversely affect function and service life.

Figure 2:
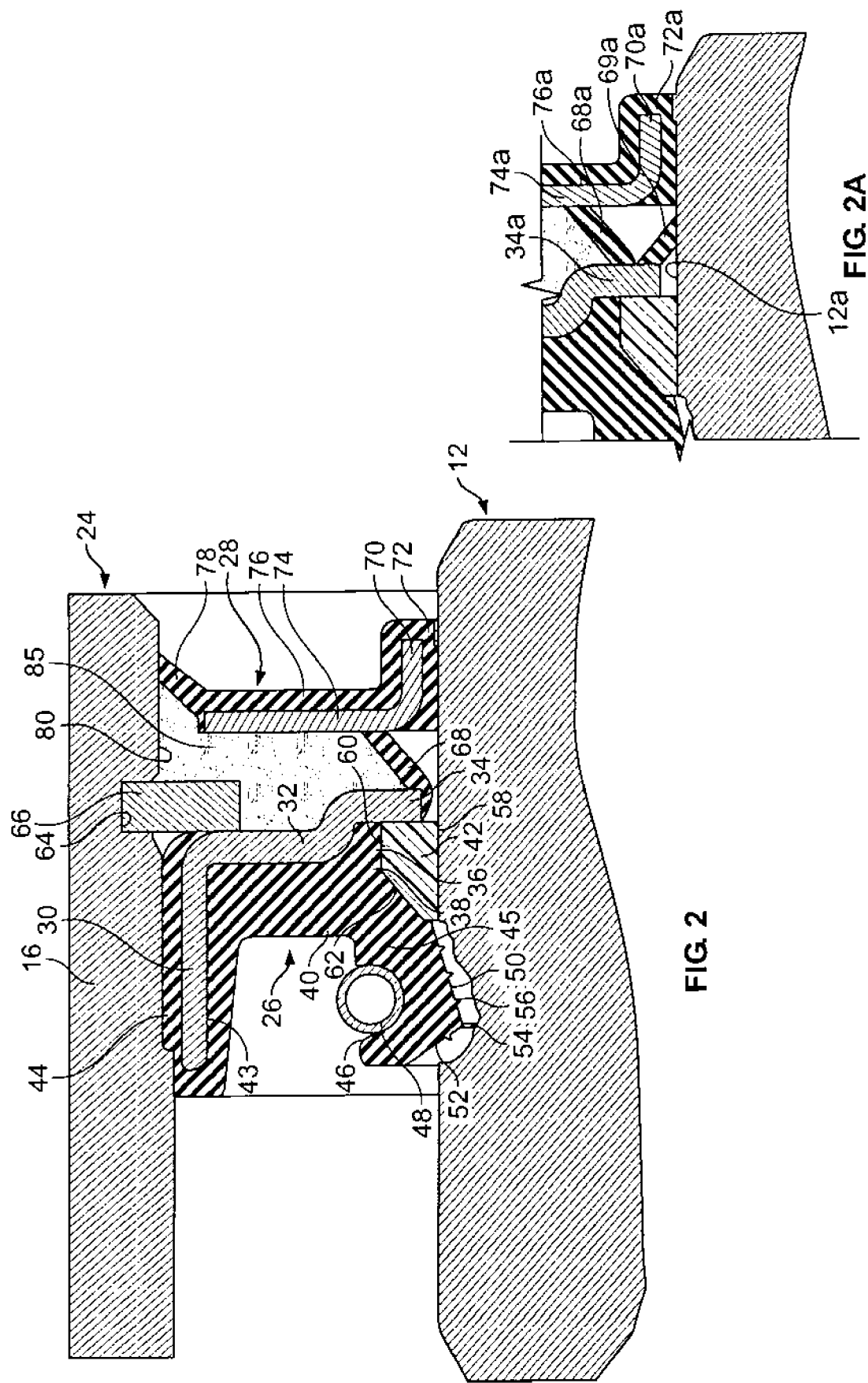
FIG. 2 is a vertical sectional view of one embodiment of the invention, showing the primary and excluder lip sealing elements thereof.

Referring now to FIG. 2, there is shown an embodiment of the seal assembly of the present invention including a steering input portion 12 in the housing 16. The upper seal assembly generally designated 24 includes a high pressure seal generally designated 26 and an excluder seal generally designated 28. The high pressure seal assembly 26 includes a seal casing having an axial flange 30, a radial flange 32 and an offset, radially extending inner flange 34 forming the radially innermost portion of the radial flange 32.

The offset flange 34 partially defines a pocket 36, in combination with a rubber inner surface 38 on the seal body interior 40, for the stiffener or backup ring 42. The seal body 40 also includes an axially extending, radially inner portion 43, and a rubber outer diameter secondary sealing portion 44. The seal body 40 has a flexible neck section 45 and has a groove 46 for receiving a garter spring 48. The seal body 40 also includes a frustoconical air side surface 50 and a frustoconical oil side surface 52 meeting along a generally circular locus to define a circumferentially extending seal band 54 around the rotatable shaft 12. Optionally, the air side 50 may include one or more concentric bead features 56 to enhance sealing performance and extend life.

The plastic stiffener or backup ring 42 includes a radially inner, axially extending surface 58, a radially outer, axially extending surface 60, and an inclined surface 62 designed to cooperate with the shaped pocket 36. The housing 16 includes a circumferential groove 64 for accommodating a snap ring 66 which is intended to prevent displacement or extrusion of the seal, even in the presence of extremely high pressure on the interior or oil side (to the left in FIG. 2) of the seal 26. The snap ring 66 interfaces with the radial flange 32 of the high pressure seal 26 for this purpose. The offset flange 34 includes a wiper lip 68 extending axially from the radially inner most portion of the flange 34.

The other portion of the excluder seal assembly generally designated 28 includes an axially extending, radially inner flange 70 having a rubber surface 72 covering it, a radially extending flange 74 and an axially outer rubber face 76 terminating in an axially angled, radially extending lip 78 bearing on an axially extending inner bore surface 80 of the housing. Thus, the construction includes both an axially extending lip 68 bearing on a radially extending surface 74 and a radially extending lip 78 sealing on the bore surface 80, both working in concert to protect the high pressure seal 26 from contaminants.

In this embodiment, the space 85 between the seals 26 and 28 is filled with grease, which can trap particles and prevent farther contaminant ingress, while lubricating the excluder lips to minimize dry wear, friction, and potential noise.

FIG. 2A shows an alternate construction in which the innermost flange 34a includes an axial dust lip 68a bearing on the flange 74a and an additional radial dust lip 69a bearing on the shaft 12a. The positions of the flanges 70a, 74a and the rubber 76a are the same as in FIG. 2.

Figure 3:
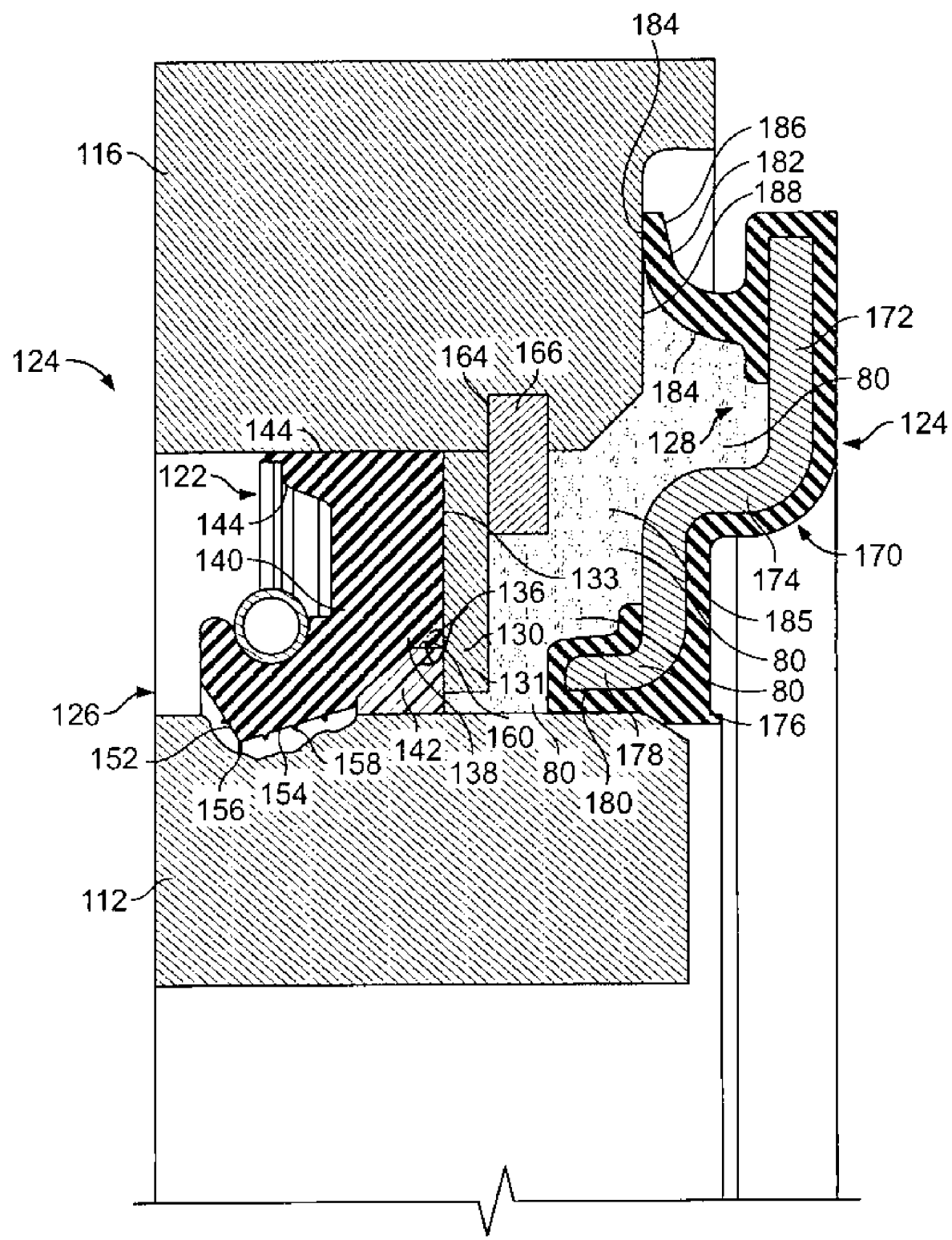
FIG. 3 is a vertical sectional view of another form of the invention, wherein the excluder seal includes an axial lip riding on the end face of the pressurized housing.

Another embodiment of the invention, with somewhat different features, is shown in FIG. 3. Referring now to FIG. 3, there is shown a steering input portion 112 disposed within a housing 116. The seal assembly 124 includes a high pressure seal generally designated 126 and an excluder seal generally designated 128. The high pressure seal 126 includes a seal casing radial flange 130. This flange may have, but need not have, additional surfaces or flanges. There is an angled rubber surface 138 which partially defines the pocket 136 in which the backup ring 142 (sometimes referred to as a stiffener) is disposed. The seal body 140 includes an axially extending rubber outer diameter surface 144 engaging in the housing 116. The outer end face portion 133 of the seal body is bonded to the casing 130 of the seal, and the lower portion 131 of the casing 130 forms a portion of the pocket 136 for the backup ring 142.

The housing 116 includes a groove 164 for accommodating a snap ring 166 which is intended to prevent axial displacement or extrusion of the seal member 126 under high pressure. The seal body 140 includes oil and air-side frustoconical surfaces 152 and 154, meeting along a generally circumferential locus to define a sealing lip or band 156.

Optionally, the air side portion 154 of the seal surface may include one or more concentric bead feature 158 therein to enhance sealing performance and extend seal life.

Referring now to the other component of the seal assembly, this embodiment includes a casing generally designated 170 and including an outermost, radially extending portion 172, and an inwardly directed (toward the fluid) offsetting portion 174, a second radially extending portion 176 and finally, a lowermost, axially inwardly directed portion 178. This seal portion includes a radially innermost, axially extending rubber portion 180 which is dimensioned so as to be in snug sealing relation with the rotatable steering column portion 112.

In addition, the radially outermost portion 172 of the metal flange has bonded thereto a wiper lip 182 having inner and outer radial surfaces 184,186, the surface 184 of which is designed to contact a part of the end face portion 188 of the housing 116. The configuration of this lip is such that it will tolerate an anticipated axial tolerance stack up of the shaft 112 in relation to the housing 116.

The space 185 between the seal elements 126 and 128 is filled with grease, which can trap particulates and prevent further contaminant ingress, while lubricating the excluder lips to minimize dry wear, friction, and potential noise.

Certain variations of the disclosed embodiments will occur to the skilled in the art. For example, there are disclosed two forms of the casing. The axial flange is shown as being present in one variation, but it may be absent in that embodiment. Likewise, the offset in the radial flange which is present in one version may be absent from that version, but may be present in the other version. A garter spring is shown but it is conceivable that this could take another form, or be absent entirely. The direction in which the flange on the wiper lip extends is shown to be preferred in two versions, but may be reversed in some cases. The exact form of the wiper lips is also subject to variation, i.e. a second or third lip is also conceivable.

It will thus be seen that the present invention provides a novel solution to certain sealing problems, and overcomes these and other problems by providing seals having a number of advantages and characteristics, including those pointed out and others which are inherent in the invention

What is claimed is:

1. A multi-piece fluid seal assembly for use with a rotary shaft of a power steering mechanism comprising;
   a first piece of said seal assembly forming a portion of a pressurized fluid-containing housing, said first piece including a high-pressure seal comprising:
      an annular seal casing having an axial flange, a radial flange and an axially offset radial flange extending from said radial flange which forms the innermost radial portion of said annular seal casing; and
      an annular elastomeric seal body including a flexible neck section oriented toward an oil side of said seal body and supporting circumferentially continuous frusto-conical air side and oil side surfaces meeting to define an annular seal band that extends from said flexible neck section toward the oil side of said seal body, and having an annular pocket defined at least in part by said axially offset radial flange;
      a resinous seal backup ring disposed radially inside said annular pocket and being at least partially supported by said axially offset radial flange against axial displacement, the resinous seal backup ring being positioned by, location of said pocket, such that a radially inner, axially extending surface of said resinous seal backup ring can make contact with said rotatable shaft during operation of said seal assembly;
   a metal snap ring for retaining said annular seal casing in said fluid-containing housing, said metal snap ring contacting an outer surface of said radial flange near a point where said radial flange meets said axial flange;
   an elastomeric axially extending wiper lip, bonded to said axially offset radial flange;
   an elastomeric radial dust lip, bonded to said axially offset radial flange and being radially innermost from said elastomeric axially extending wiper lip; and
   a second piece of said multi-piece seal assembly comprising:
      an annular stiffener with an L-shaped cross-section defined by a radially extending stiffener flange and an axially extending radially inner stiffener flange, wherein said elastomeric axially extending wiper lip, bonded to said axially offset radial flange of said first piece, bears on said radially extending stiffener flange;

an annular excluder seal elastomeric seal body bonded to said annular stiffener, and surrounding said axially extending radially inner stiffener flange such that a radial surface of said elastomeric seal body is positioned to make sealing contact with said shaft;

an axially angled, radially extending annular excluder lip, that extends outwardly away from said annular seal casing, and also being bonded to a radially outermost end of said radially extending stiffener flange of said annular stiffener and forming a rotary excluder seal between said annular stiffener and said pressurized fluid-containing housing;

wherein a space formed by an axially extending inner bore surface of said housing, air side surfaces of said radial flange and of said axially offset radial flange of said seal casing, an inner oil side facing surface of said radially extending stiffener flange and said axially extending wiper lip, contains grease.

2. A fluid seal assembly as defined in claim 1 wherein said seal casing axial flange has a portion of said annular elastomeric seal body covering a radially outermost surface of said axial flange and forming a fluid-tight interference fit with said axially extending inner bore surface of said fluid-containing housing.

3. A fluid seal assembly for installation between an annular fluid-containing housing and a rotatable shaft forming part of a high pressure environment, said fluid seal assembly comprising, in combination, an annular high pressure seal and at least one annular excluder seal, said excluder seal, in sealing relation to said rotatable shaft and said housing, comprising:

an annular stiffener with an L-shaped cross-section defined by a radially extending stiffener flange and an axially extending radially inner stiffener flange;

an annular excluder seal elastomeric seal body bonded to said annular stiffener, and surrounding said axially extending radially inner stiffener flange such that a radial surface of said elastomeric seal body is positioned to make sealing contact with said shaft;

an axially angled, radially extending annular excluder lip, that extends outwardly away from said annular high pressure seal, and also being bonded to a radially outermost end of said radially extending stiffener flange of said annular stiffener and forming a rotary excluder seal between said annular stiffener and said annular fluid-containing housing;

wherein said high pressure seal comprises:

an annular casing member comprising an axial flange having a radially inner surface and a radial flange having an axially offset radial flange extending therefrom and forming a radially innermost portion;

a metal snap ring engaging said radial flange and retaining said casing against being expelled from said housing, said high pressure seal having an annular rubber primary lip element including a portion bonded to said radially inner surface of said axial flange and to one face of said radial flange thereof;

a lip body portion and a flex neck portion joining said lip body portion to said bonded portion, said lip body portion including air and oil side frusto-conical surfaces meeting along a path of intended contact to form a seal band with said associated rotatable shaft;

a pocket portion lying between said lip body portion and said radially innermost portion of said radial flange;

a synthetic resinous annular back-up ring disposed in said pocket portion, the resinous seal backup ring being positioned by, location of said pocket portion, such that a radially inner, axially extending surface of said resinous seal backup ring can make contact with said rotatable shaft during operation of said seal assembly;

an elastomeric axially extending wiper lip, bonded to said axially offset radial flange, and bearing on said radially extending stiffener flange; and an elastomeric radial dust lip, bonded to said axially offset radial flange and being radially innermost from said elastomeric axially extending wiper lip.

4. A fluid seal assembly as defined in claim 3 wherein said excluder lip contacts a radial end face surface on said fluid-containing housing.

* * * * *